US008775230B2

(12) United States Patent
Casas et al.

(10) Patent No.: US 8,775,230 B2
(45) Date of Patent: Jul. 8, 2014

(54) HYBRID PREDICTION MODEL FOR A SALES PROSPECTOR (75) Inventors: Francisco V. Casas, San Mateo, CA (US); Jooyoung John Kim, Palo Alto, CA (US); Krisztian Z. Danko, Waterloo (CA); Peter J. Stengard, St. Pete Beach, FL (US); Ari Mozes, Lexington, MA (US); Marcos Campos, Billerica, MA (US)

(73) Assignee: Oracle International Corporation, Redwood Shores, CA (US)

( * ) Notice: Subject to any disclaimer, the term of this patent is extended or adjusted under 35 U.S.C. 154(b) by 717 days.

(21) Appl. No.: 12/476,566

(22) Filed: Jun. 2, 2009

(65) Prior Publication Data

US 2010/0114663 A1 May 6, 2010

Related U.S. Application Data (60) Provisional application No. 61/110,729, filed on Nov. 3, 2008.

(51) Int. Cl.
*G06Q 10/00* (2012.01)
*G06Q 30/00* (2012.01)
*G06Q 10/06* (2012.01)
*G06Q 30/02* (2012.01)

(52) U.S. Cl.
CPC .......... *G06Q 30/0202* (2013.01); *G06Q 10/067* (2013.01); *G06Q 30/02* (2013.01); *G06Q 30/0204* (2013.01)
USPC ...................................... 705/7.31; 705/7.29

(58) Field of Classification Search
USPC ............................................. 705/7.11–7.42
See application file for complete search history.

(56) References Cited

U.S. PATENT DOCUMENTS

| 5,812,840 | A | 9/1998 | Shwartz |
|---|---|---|---|
| 6,236,975 | B1 * | 5/2001 | Boe et al. ...................... 705/7.32 |
| 6,820,060 | B1 * | 11/2004 | Eisner ........................... 705/7.31 |
| 7,120,629 | B1 | 10/2006 | Seibel |
| 7,275,083 | B1 | 9/2007 | Seibel |
| 7,370,033 | B1 | 5/2008 | Roychowdhury |
| 2002/0029220 | A1 | 3/2002 | Oyanagi et al. |
| 2002/0107858 | A1 | 8/2002 | Lundahl et al. |
| 2002/0161664 | A1 | 10/2002 | Shaya et al. |
| 2002/0174119 | A1 | 11/2002 | Kummamuru et al. |
| 2003/0063779 | A1 | 4/2003 | Wrigley |

(Continued)

OTHER PUBLICATIONS

Agrawal, Fast Discovery of Association Rules, Advances in Knowledge Discovery and Data Mining, 1996, p. 307-28.*

(Continued)

*Primary Examiner* — Justin M Pats
*Assistant Examiner* — Sujay Koneru
(74) *Attorney, Agent, or Firm* — Miles & Stockbridge P.C.

(57) ABSTRACT

Systems and methods provide a system for generating a sales prospect recommendation that uses demographic data to make a sales prospect recommendation that includes a product recommendation with a probability that the sale will close, and may include an estimated time to close the sale and projected revenue. The system imports customer data including past purchasing data and demographic data for a plurality of customers. The system can then generate a predictive model by training the model using the past purchasing data and the demographic data. When queried for a sales prospect recommendation, the system responds to the query with at least one sales prospect recommended by the predictive model.

17 Claims, 5 Drawing Sheets

(56) References Cited

U.S. PATENT DOCUMENTS

| | | | | |
|---|---|---|---|---|
| 2003/0187708 | A1* | 10/2003 | Baydar et al. | 705/7 |
| 2003/0216956 | A1* | 11/2003 | Smith et al. | 705/10 |
| 2004/0103017 | A1* | 5/2004 | Reed et al. | 705/10 |
| 2005/0149466 | A1 | 7/2005 | Hale et al. | |
| 2005/0192831 | A1* | 9/2005 | Ellison et al. | 705/1 |
| 2005/0210049 | A1 | 9/2005 | Foster | |
| 2006/0047717 | A1 | 3/2006 | Pereira | |
| 2006/0195338 | A1* | 8/2006 | Seibel et al. | 705/1 |
| 2006/0229932 | A1 | 10/2006 | Zollo | |
| 2007/0033098 | A1 | 2/2007 | Peters | |
| 2007/0043609 | A1* | 2/2007 | Imam et al. | 705/11 |
| 2007/0112614 | A1* | 5/2007 | Maga et al. | 705/10 |
| 2007/0112733 | A1* | 5/2007 | Beyer et al. | 707/3 |
| 2007/0239514 | A1* | 10/2007 | Lissy et al. | 705/10 |
| 2007/0244741 | A1* | 10/2007 | Blume et al. | 705/10 |
| 2008/0046264 | A1* | 2/2008 | Rudnick | 705/1 |
| 2008/0162574 | A1* | 7/2008 | Gilbert | 707/104.1 |

OTHER PUBLICATIONS

Prem Melville et al.; "Finding New Customers Using Unstructured and Structured Data"; IBM T.J. Watson Research Center; Aug. 12-15, 2007; San Jose, CA; pp. 1-8.; http://www.cs.utexas.edu/~melville/papers/ascot-kdd07.pdf.

Call Center Technology; "DSC Tech Library"; copyright © 1998-20009 Database Systems Corp, last modified: 2009; pp. 1-5; http://www.databasesystemscorp.com/tech-call_centers_42.htm.

Management&Technology, Manufacturer Digest; "Customer Relations Management (CRM)"; Oct. 20, 2002; pp. 30-36; http://www.ncs.com.sg/documents/manufac.%20digest%2023%20oct%2000.pdf.

Acxiom FirmographicX TM; "Australia's First B2B Marketing Segmentation Solution."; www.acxiom.com.au; © 2007 Acxiom Corporation; pp. 1-2; http://www.acxiom.com.au/AppFiles/Download124/Fact_Sheet_-_Acxiom_FirmographicX-1211200771218.pdf.

S. Aramuga Perumal; "Integrating E-Commerce and CRM With Data Mining: A New Era"; Journal of Internet Banking and Commerce; Dec. 2005; vol. 10, No. 3; pp. 1-7; http://www.arraydev.com/commerce/JIBC/2006-02/crm.htm.

MITSloan Management Review; "The Prediction Lover's Handbook"; Jan. 7, 2009; p. 1; Copyright © Massachusetts Institute of Technology; http://sloanreview.mit.edu/the-magazine/articles/2009/winter/50208/the-prediction-lovers-handbook/.

Ruth N. Bolton et al.; "Managing Customer Relationships"; pp. 3-38; http://www.ruthnbolton.com/Publications/01Malhotra-V3-Chap1.pdf; downloaded Sep. 18, 2009.

Omniture; "Online Marketer's Segmentation Guide"; www.omniture.com; Feb. 2007; http://www.wsiuniquewebdesign.co.za/files/segmentation_guide.pdf.

Office Action dated Jun. 9, 2011, issued in U.S. Appl. No. 12/486,933.

* cited by examiner

HYBRID PREDICTION MODEL FOR A SALES PROSPECTOR

CROSS REFERENCE TO RELATED APPLICATIONS

This application claims priority to provisional application No. 61/110,729 filed Nov. 3, 2008, which is hereby incorporated by reference.

FIELD OF THE INVENTION

One embodiment is directed generally to customer sales, and more particularly to an optimized model for generating product recommendations for a customer.

BACKGROUND INFORMATION

A sales lead includes a name or other indicia of identity (e.g., a phone number, mailing address or email address) of a person or business that may have an interest in purchasing a product or service. A sales lead provides a starting point for a salesperson to further develop the lead by marketing a specific vendor's product or service. The salesperson develops the sales lead by gathering information about the potential customer and providing the customer with information about the vendor. This mutual exchange of information helps the salesperson to persuade the potential customer to purchase a product or service from the vendor. If the customer makes a purchase, the salesperson has converted the sales lead into a sales transaction. A sales lead with a high probability of being converted into a sales transaction is considered a good lead.

Data mining can assist in generating sales leads by finding patterns in information gathered about customers. In the past, vendors have used data mining to match potential customers to products. While this is helpful, a lead itself possesses no measure of success in terms of converting the lead into a sale. There may be other factors that figure into the success of a lead which are not presently accounted for. Moreover, there is no model for accounting for these other factors.

SUMMARY OF THE INVENTION

One embodiment is a system that uses demographic data to generate a sales prospect recommendation that includes a product recommendation with a probability that the sale will close, and may include an estimated time to close the sale and projected revenue. The system imports customer data including past purchasing data and demographic data for a plurality of customers. The system can then generate a predictive model by training the model using the past purchasing data and the demographic data. When queried for a sales prospect recommendation, the system responds to the query with at least one sales prospect recommended by the predictive model.

DETAILED DESCRIPTION

One embodiment is a sales prospector that identifies potential sales prospects and analyzes the past purchasing patterns of customers (throughout this specification, "customer" may refer to existing or potential customers). In one embodiment, a "prospect" is a combination of a customer and a specific product, which may be used to prepare for a sales call. One embodiment predicts which customers in a sales representative's territory will be interested in purchasing certain products, based on an analysis of the buying patterns of similar customers. A sales representative can see what the next purchases are likely to be for their customers, as well as the probability, revenue potential, and time to close for each prediction. In addition, they can drill down into the details to do further analysis.

In one embodiment, an administrator will first upload customer data with which to train a prediction model. The customer data may include past purchasing history, assets, demographics, etc. Hybrid prediction models are then trained based on both the demographic pattern data and the past purchasing pattern data in the customer data. The model is considered a "hybrid" because it uses two types of data when creating the model. One type of data includes two-dimensional demographics data where each customer has one row with some attribute values set for a constant set of attributes. The other type of data, transactional data, relates to the customers' orders. The number of orders and products differ per customer. Once the models are built, a salesperson may query the models to acquire sales prospects.

A data mining operation based on association rules returns a recommended product based on the frequency of items purchased and the co-occurrence of items together. A recommended product(s) for a customer is returned, along with the probability the customer will purchase the product(s), the expected revenue, and the predicted time to close the sale. One embodiment uses both customer attributes and past purchase history to group similar customers together. The customer attributes capture the customer profile, and can include information such as annual revenue, number of employees, geographic location, and so on. The purchase history can include information such as products purchased, assets, etc.

Figure 1:
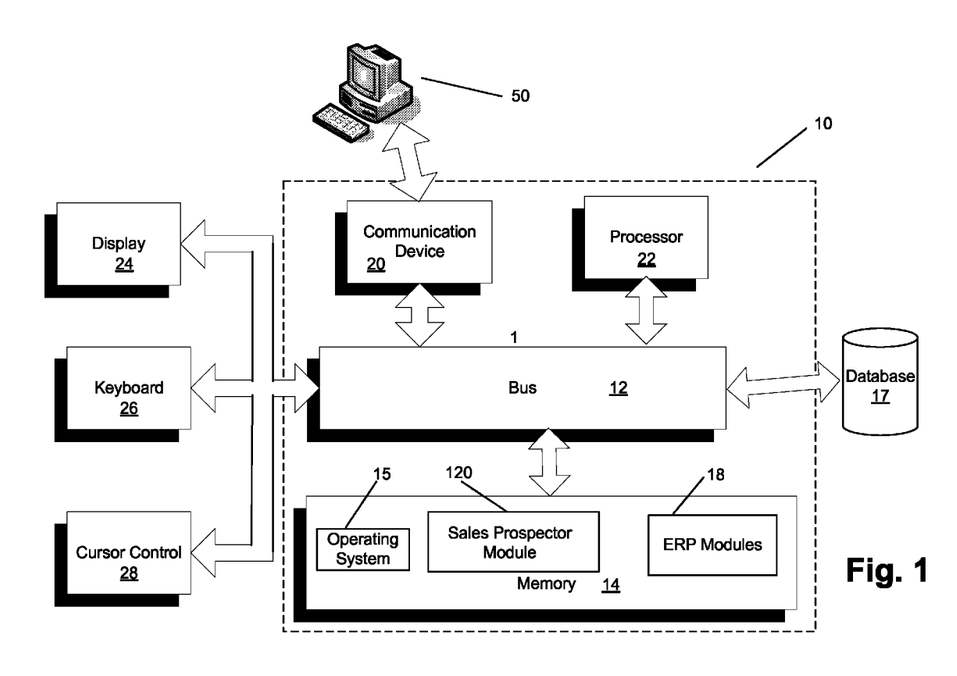
FIG. 1 is a block diagram of a system that can implement a sales prospector in accordance with an embodiment.

FIG. 1 is a block diagram of a system 10 that can implement a sales prospector in accordance with one embodiment. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network (such as the Internet) or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a sales prospector module 120. This module is described in greater detail below. The modules may further include enterprise resource planning ("ERP") modules 18 of an ERP system that may interact with sales prospector module 120. An ERP system is a computer system that integrates several data sources and processes of an organization into a unified system. A typical ERP system uses multiple components of computer software and hardware to achieve the integration. A unified ERP database 17, coupled to bus 12, is used to store data for the various system modules. In one embodiment, ERP modules 18 are part of the "Oracle E-Business Suite Release 12" ERP system from Oracle Corp. In other embodiments, sales prospector module 120 may be a stand-alone system and not integrated with an ERP system, or may be part of any other integrated system. In some embodiments, the functions of sales prospector module 120, described below, are directed and utilized remotely from a user's computer 50 through communication device 20. In one embodiment, the functionality disclosed below may be accessed remotely by a user as a software as a service ("SAAS").

Figure 2:
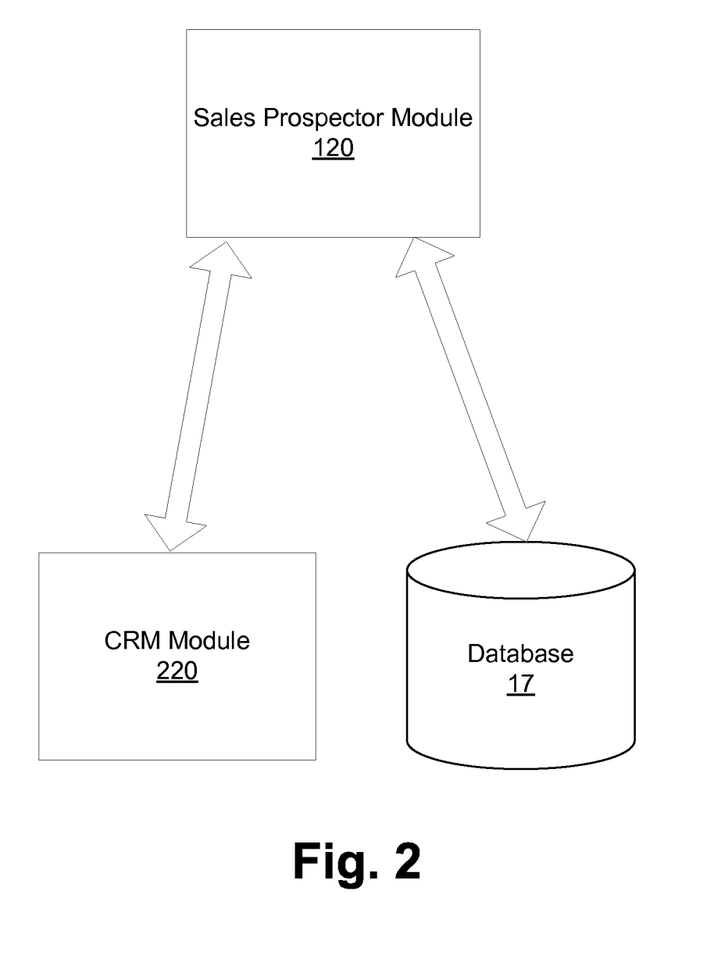
FIG. 2 illustrates a logical diagram of a sales prospector in an accordance with an embodiment.

FIG. 2 illustrates a logical diagram of a customer relationship management ("CRM") system 200 in which sales prospector module 120 may be used in accordance with an embodiment. CRM module 220 is an ERP module for managing customer information, including demographic data about customers, past purchasing patterns, assets owned, etc. CRM module 220 includes schemas for the customer data, and interacts with database 17 to store the customer data in database 17 in accordance with these schemas. Sales prospector module 120 includes user interfaces (described below) for viewing customer data, for entering queries for sales prospects, and for viewing the results of those queries. Sales prospector 120 performs data mining in database 17 to retrieve the results of the queries. In one embodiment, a search can be performed that returns a list of potential sales prospects based on the name of a product. A user can specify the name of a product and a list of recommended customers that should be sold the product will be returned.

Figure 3:
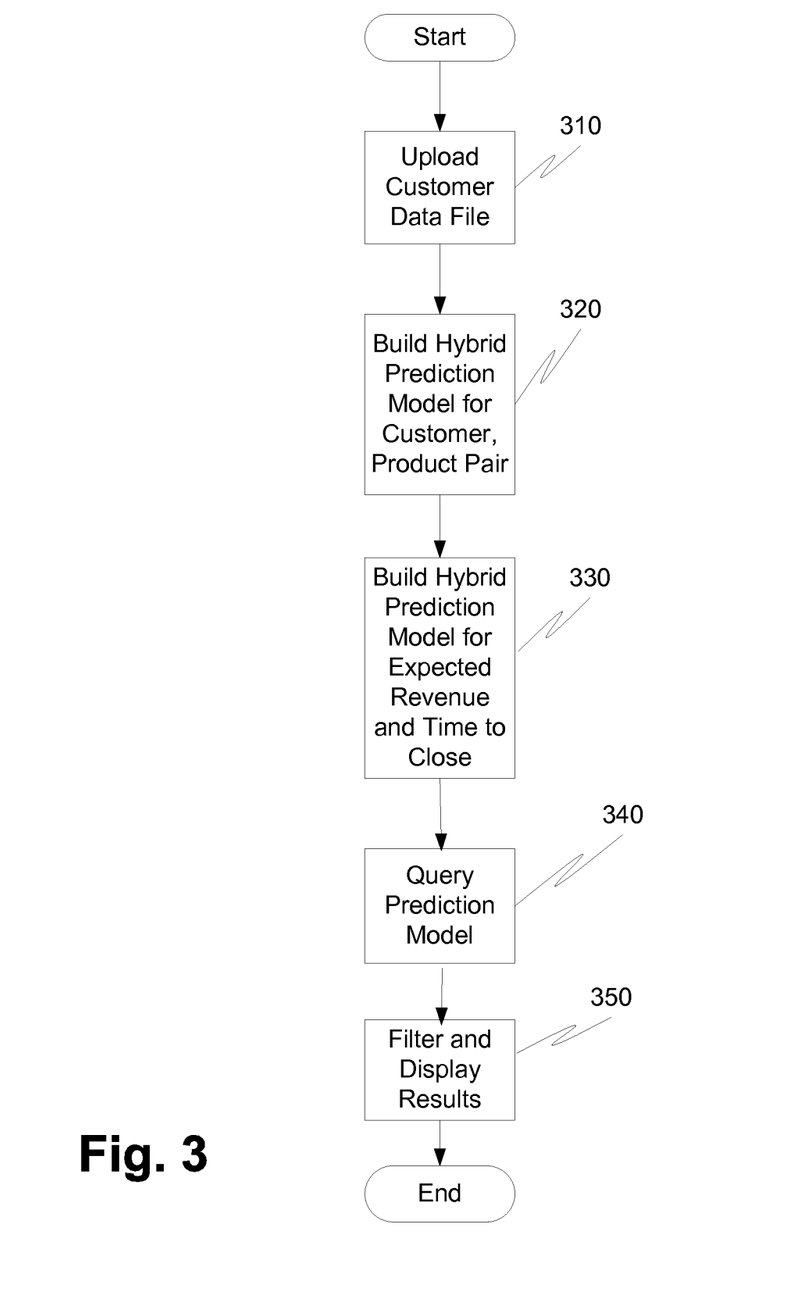
FIG. 3 illustrates a flow diagram of the functionality of the sales prospector in accordance with an embodiment.

FIG. 3 illustrates a flow diagram of the functionality of a sales prospector module 120 in accordance with an embodiment. In one embodiment, the functionality of the flow diagram of FIG. 3 is implemented by software stored in memory and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

An administrator of the system 10 first imports customer data into the sales prospector module 120 in the form of a Comma Separated Value ("CSV") file (310). The customer data may be imported, for example, from database 17, and includes both purchasing pattern attributes and demographic attributes. The CSV files are a fixed file format that include five record types: customers, products, orders, order lines, and target customers by user. The CSV file formats follow a specific format, described below, in an embodiment. The CSV files may be imported into sales prospector module 120 in any order. For sales prospector module 120 to make a prediction, at least the following record types should be present: customers, products, orders, and order lines. In the CSV file, each column is separated by a comma, and each record starts on a new line.

A sample customers.csv file is now described. Table 1 illustrates the data types for customer records:

TABLE 1

| Column | Data Type | Max. Length | Required | Description |
| --- | --- | --- | --- | --- |
| Customer_ID | String | 30 Char. | Yes | Customer identifier |
| Customer_Name | String | 200 Char. | Yes | Customer name |
| Customer_Location | String | 300 Char. | No | Customer location |
| Owner_Email | String | 100 Char. | Yes | Email address of account owner |
| Owner_Name | String | 200 Char. | Yes | Name of the customer account owner |
| VarChar_1 | String | 200 Char. | No | Industry |
| VarChar_2 | String | 200 Char. | No | Headquarter's country |
| VarChar_3 | String | 200 Char. | No | Public or Private |
| VarChar_4 | String | 200 Char. | No | Importer or Exporter |
| VarChar_5 | String | 200 Char. | No | Custom string field |
| Numeric_1 | Number | 10 digits | No | Annual revenue |
| Numeric_2 | Number | 10 digits | No | Number of employees |
| Numeric_3 | Number | 10 digits | No | Number of locations |
| Numeric_4 | Number | 10 digits | No | Custom numeric field |
| Date_1 | Date | N/A | No | Custom date field |

An example customers.csv file is presented below:
Customer_ID, Customer_Name, Customer_Location, Owner_Email, Owner_Name, VarChar_1, VarChar_2, VarChar_3, VarChar_4, VarChar_5, VarChar_6, VarChar_7, VarChar_8, VarChar_9, VarChar_10, Numeric_1, Numeric_2, Numeric_3, Numeric_4, Numeric_5, Numeric_6, Numeric_7, Numeric_8, Numeric_9, Numeric_10, Date_1, Date_2, Date_3, Date_4, Date_5, Date_6, Date_7, Date_8, Date_9, Date_10

Cust-01, Customer 1 Name, , brenda.moore@company.com, Brenda Moore, Manufacturing, Canada, Public, Both, , , , , , , 4521, 135, 3, , , , , , , , , , , , , , , , Cust-02, Customer 2 Name, USA, donna.parker@company.com, Donna Parker, Financial Services, USA, Public, Importer, , , , , , , 12129, 929, 6, , , , , , , , , , , , , , , A sample products.csv file is now described. Table 2 illustrates the data types for product records:

TABLE 2

| Column | Data Type | Max. Length | Required | Description |
| --- | --- | --- | --- | --- |
| Product_ID | String | 30 Char. | Yes | Product identifier |
| Product_Name | String | 100 Char. | Yes | The product name |

An example products.csv file is presented below:
Product_ID, Product_Name
Prod-01, Oracle Database 10g
Prod-02, Oracle Database 11g A sample orders.csv file is now described. Table 3 illustrates the data types for order records:

TABLE 3

| Column | Data Type | Max. Length | Required | Description |
| --- | --- | --- | --- | --- |
| Order_ID | String | 30 Char. | Yes | Order header identifier |
| Customer_ID | String | 30 Char. | Yes | Identifies customer on this order |

An example orders.csv file is presented below:
Order_ID, Customer_ID
Order-01, Cust-01
Order-02, Cust-02

A sample order_lines.csv file is now described. Table 4 illustrates the data types for order line records:

TABLE 4

| Column | Data Type | Max. Length | Required | Description |
| --- | --- | --- | --- | --- |
| Order_Line_ID | String | 30 Char. | Yes | Order line identifier |
| Order_ID | String | 30 Char. | Yes | Order identifier |
| Product_ID | String | 30 Char. | Yes | Product_ID references a product in the Products.csv file |
| Quantity | Number | 15 digits with 2 decimal places | No | Quantity sold on this order line |
| Amount | Number | 15 digits with 2 decimal places | No | The order line amount |
| Close_Date | Date | N/A | No | The date when the product sale is closed |
| Lead_Date | Date | N/A | No | The date when the lead that resulted in this order line was received |

An example order_line.csv file is presented below:
Order_Line_ID, Order_ID, Product_ID, Quantity, Amount, Close_Date, Lead_Date
Order-Ln-01, Order-01, Prod-01, 10, 10, 2007-02-06, 2008-10-15
Order-Ln-02, Order-02, Prod-02, 50, 50, 2007-03-09, 2009-02-15

A sample member_customers.csv file is now described. Table 5 illustrates the data types for user-to-customer mapping records:

TABLE 5

| Column | Data Type | Max. Length | Required | Description |
| --- | --- | --- | --- | --- |
| User_Email | String | 100 Char. | Yes | The email address of a community member |
| Customer_ID | String | 30 Char. | Yes | The customer identifier |
| Operation | String | 2 Char. | Yes | Indicates whether the current record should be inserted or deleted in the database, as follows: "I" indicates an insert. The insert does not succeed if the record already exists "UC" indicates an update by customer "UM" indicates an update by member (the sales representative) "D" indicates delete |

An example member_customers.csv file is presented below:
User_Email, Customer_ID, Operation
brenda.moore@company.com, Cust-01, I
brenda.moore@company.com, Cust-02, I
donna.Parker@company.com, Cust-04, I Next, a hybrid prediction model is built for predicting a prospect (i.e., a customer and product) and a probability that the potential transaction will materialize if pursued (320). Probability is measured as a percentage from 0-100%. For example, the model may predict an 83% probability of purchase of a 500 kW motor based on the fact that 83% of customers who purchase a 2 kVA transformer also purchase a 500 kW motor. This model is based on the strength of the buying signals in the customer data using both purchasing behavior and customer demographics. Demographic attributes and purchasing pattern attributes are used in a data mining algorithm to build association rules. In one embodiment, demographic attributes may include customer location, industry, headquarter country, whether they are public or private, whether they are an importer or an exporter, the number of locations, the number of employees, annual revenue, etc., and purchasing pattern attributes may include previous purchases, assets, etc. An embodiment may use the Apriori data mining algorithm to build association rules.

Apriori is a classic algorithm for learning association rules. Apriori is designed to operate on databases containing transactions (for example, collections of items bought by customers, or details of a website frequentation). As is common in association rule mining, given a set of transactions (for instance, sets of retail transactions, each listing of individual items purchased), the algorithm attempts to find subsets of items which are common to at least a minimum number "S" (the support threshold) of the transactions. Apriori uses a "bottom up" approach, where frequent subsets are extended one item at a time (a step known as "candidate generation"), and groups of candidates are tested against the data. The algorithm terminates when no further successful extensions are found. Apriori uses breadth-first search and may use a tree structure to count candidate itemsets efficiently. It generates candidate itemsets of length k from itemsets of length k−1. It then prunes the candidates which have an infrequent sub pattern. According to the downward closure lemma, the candidate set contains all frequent k-length itemsets. Next, it scans the transaction database to determine frequent itemsets among the candidates. One of ordinary skill in the art will recognize that other data mining algorithms instead of Apriori may be used to build association rules based on attribute data.

In the first pass of the data mining, the frequency of items purchased is used for the basis of frequent itemsets, i.e., the number of times a customer purchased a particular product in the set of all products. In the second pass of the data mining, the co-occurrences of products together is used for the basis of frequent itemsets, i.e., the frequency that product A was bought along with product B. In addition, demographics are included at this stage, e.g., 85% of customers in the automotive industry (a demographic) purchase a 500 kW motor (a product). Next, rule generation is performed using the combination of counts for product/demographic A, product B, and the co-occurrence of A with B, and filtering may be used based on the rule confidence. Furthermore, numerical value attributes may be divided into bins. For example, the revenue attribute may be divided into bins of $0-$25,000; $25,001-$100,000; $100,001-$500,000; $500,001-$1,000,000; etc. The process may continue by investigating subsets of length three and beyond.

Next, a hybrid prediction model is built to predict expected revenue and expected time to close (330). This model is built using a clustering data mining function using demographic attributes and purchasing pattern attributes. In an embodiment, the clustering algorithm used is the k-means algorithm. The k-means algorithm is an algorithm to cluster n objects based on attributes into k partitions, k<n. It assumes that the object attributes (demographic and purchasing pattern attributes) form a vector space. The objective it tries to achieve is to minimize total intra-cluster variance. The most common form of the algorithm uses an iterative refinement heuristic known as Lloyd's algorithm. Lloyd's algorithm starts by partitioning the input points into k initial sets, either at random or using some heuristic data. It then calculates the mean point, or centroid, of each set. It constructs a new partition by associating each point with the closest centroid. Then the centroids are recalculated for the new clusters, and algorithm repeated by alternate application of these two steps until convergence, which is obtained when the points no longer switch clusters (or alternatively centroids are no longer changed). For the purchasing pattern data, it records only whether a product was bought or not. The purchase pattern data represents each product as a unique attribute that can be either "1" (product was bought) or "0" (product was not bought). Because the clustering algorithm processes data in sparse format, this can be done in a efficient fashion as only the entries with "1" in the data need to be represented and computed.

One cluster model is built using the demographic attribute data, and a second cluster model is built using past purchasing data (i.e., a cluster for each product in the product set). Thus, for each product in the product set, a customer (who purchased the product) will have a membership in the first cluster (demographic data) and a membership in the second cluster (purchase pattern data). The average expected revenue and average time to close for each product is then calculated as the average over the cluster pairs. In one example, the time-to-close for future transactions is based on the difference between the lead date and the order date for past transactions. In one embodiment, when there is no expected revenue or average time to close for a given pair of cluster indexes, the expected revenue or average time to close for that product along one of the cluster indexes (e.g., purchasing pattern clustering) and then the other is examined. If a value is not found in the aggregation along either cluster indexes than a global metric for the product is used.

Probability identifies the likelihood that a transaction will materialize. It is computed based on the strength of buying signals in the data that have the same antecedent (i.e., cause, prerequisite) and consequent (i.e., effect, recommendation). Probability may be measured as a percentage from 0-100%. For example, predictive analytics may find from historical data that there are 100,000 customers with 2 kVA transformers. Of these customers, if 83,000 customers have both 2 kVA transformer and 500 kW motors, then 83% of customers who purchase a 2 kVA transformer also purchase a 500 kW generator, and the probability of purchase is thus 83%.

The estimated time-to-close for future transactions is based on the difference between the lead date and the order date for past transactions. To predict time-to-close for a specific customer, the model evaluates transactions made by similar customers for the same product. The time-to-close information for customers is examined similar to the prospect that has already purchased the product inside the cluster. For example, consider four orders from similar customers and with times-to-close in these orders of 4, 8, 6, and 4 months. For a new prospect, the expected time-to-close will be about 5.5 months, based on the average of similar customers.

To predict revenue for a specific customer, the model evaluates transactions made by similar customers for the same product inside the cluster. The product revenue information for customers similar to the prospect that have already purchased the product is examined. For example, consider four orders from similar customers and with revenues for these orders of $4, $8, $6, and $4. For a new product prospect, the expected revenue will be about $5.5, based on the average of similar customers.

After the hybrid predictive models are built, a user can query the models to return a sales prospect (340). For example, a user can enter a customer name to get a product, probability of close, estimated time to close, and expected revenue. Or, a user can enter a product name to get a customer, probability of close, estimated time to close, and expected revenue. Alternatively, a user can search all customers and products for customer-product pairs, including probability of close, estimated time to close, and expected revenue. The user can also filter the results of the query based on factors such as, but not limited to, a minimum probability of close, minimum expected revenue, maximum time to close, partial customer name, partial product name, etc. (350).

Figure 4:
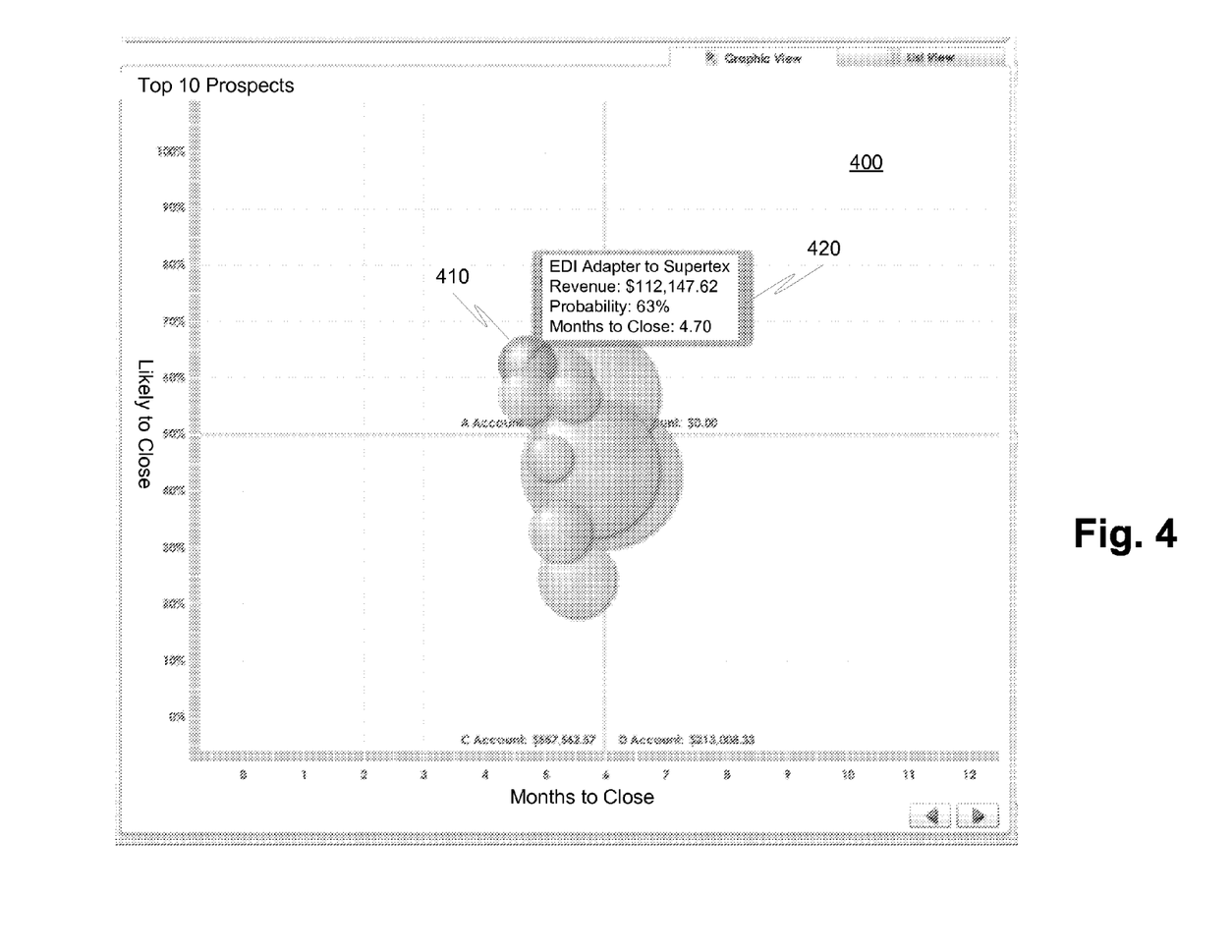
FIG. 4 illustrates an example user interface of the sale prospector in accordance with an embodiment.

FIG. 4 illustrates an example graphical output user interface 400 of the sales prospector module 120 in accordance with an embodiment, which shows each prospect as a bubble or circle on the graph. The Y-axis represents the probability of close for that prospect, the X-axis represents the expected time to close, and the size of the bubble for the prospect represents expected revenue for that prospect (i.e., a combination of a customer and a specific product). More details of each prospect can be displayed by hovering the mouse over a bubble or otherwise selecting a bubble that represents a prospect. In the example shown, the additional information for prospect/bubble 410 in box 420 indicates that the product is "EDI Adapter" and the customer is "Supertex Inc.," with an expected revenue of $112,147.62, an expected time to close of 4.7 months, and probability of close of 63%.

Figure 5:
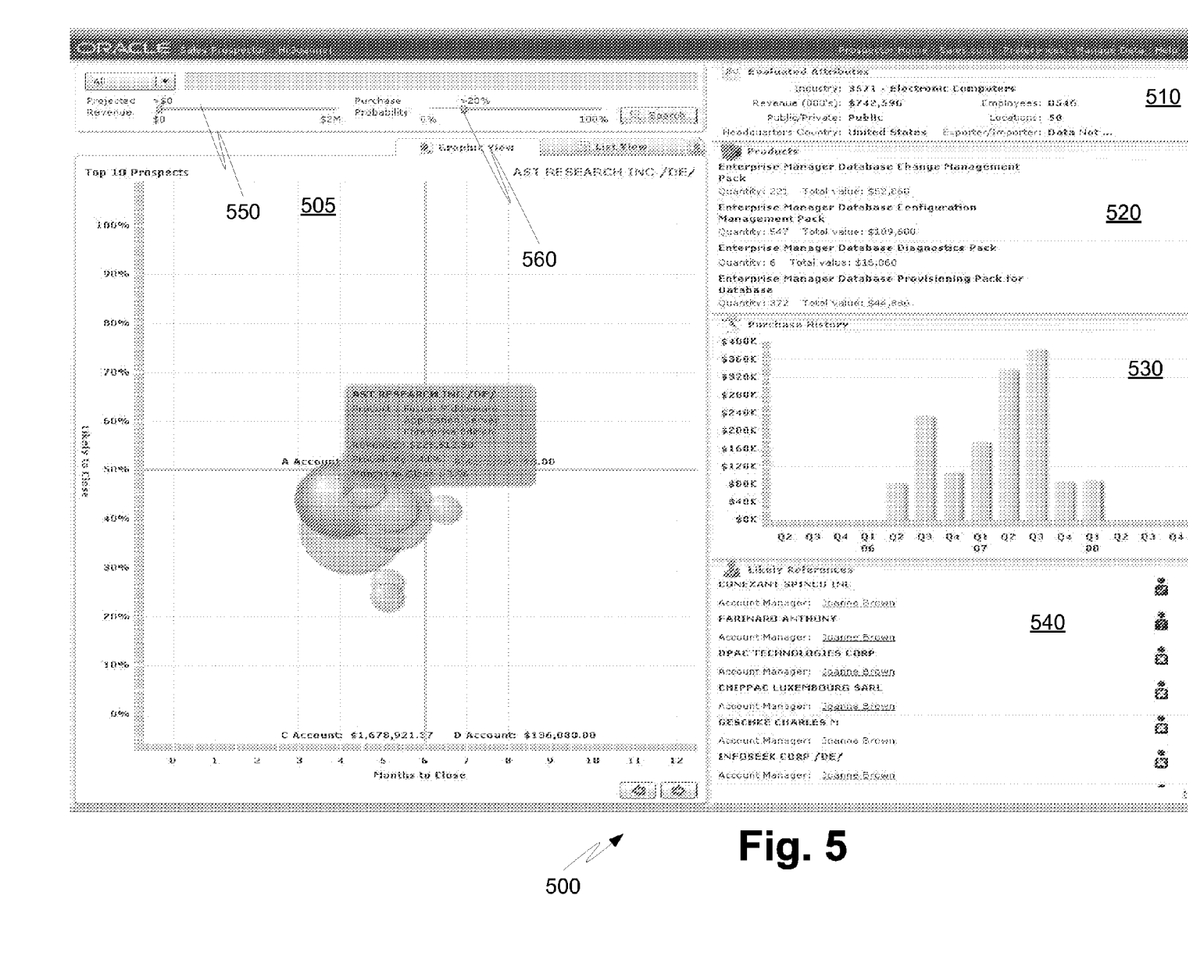
FIG. 5 illustrates another example user interface of the sale prospector in accordance with an embodiment.

FIG. 5 illustrates an example graphical output user interface 500 of the sales prospector module 120 in a dashboard view, in accordance with an embodiment. In addition to the graph view 505, similar to what is shown in FIG. 4, dashboard user interface 500 further shows evaluated attributes of a customer 510 (in this example, AST Research); a products list 520 listing recommended products for a sales call; a purchase history 530 for the particular customer, including in this example a graph of money spent on products over the past 16 quarters; and a references list 540 that lists customers of similar needs, demographics, and purchasing patterns that can be used for a sales call. Further, dashboard user interface 500 includes a projected revenue filter slider 550 for filtering results in graph view 505 based on the projected revenue of the sale if completed; and a purchase probability slider 560 for filtering results in graph view 505 based on the probability that the sale will be completed. Therefore, specific filters when searching for prospects can be used to display, for example, prospects with an expected revenue greater than $100,000; which products a specific customer is most likely to purchase; or which prospects are expected to generate the most revenue for a specific product.

As disclosed, a hybrid prediction model combining demographic data and past purchasing data is used to determine sales opportunities. The model may be used to understand a potential customer's demographic, financial and commercial profile; understand a customer's buying patterns; consider the sales recommendations that it generates based on the probability of purchase and the purchase history; estimate a time frame for sales to close and potential estimated revenue; and estimate the potential revenue from a sale. Thus, it is more effective at generating sales leads that will reduce the time investment of a salesperson while increasing the profitability of leads that are pursued.

One embodiment groups customers based on similarities in demographic attributes and purchasing patterns when determining products to recommend to a customer. Initially, the sales prospector looks for other customers that have similar demographic attributes AND purchasing patterns to produce product recommendations. Next, the sales prospector looks for other customers that have similarity in either demographic attributes OR purchasing patterns, and then adds the product recommendations from this set to the overall product recommendations. The use of the OR logic allows the sales prospector to identify product recommendations using the data that is available in determining similarity among customers even in the absence of either demographic attributes due to data quality or purchasing data for new customers.

Further, in one embodiment the sales prospector determines a degree of similarity by grouping customers by purchasing history. In determining the group to which comparison of sales history is to be made, the sales prospector groups customers based on demographic data and purchase history. The degree of similarity is computed based on this analysis and customers get grouped into a fixed number of groups to which they have the highest degree similarities in terms purchase history.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A non-transitory computer-readable medium having instructions stored thereon that, when executed by a processor, cause the processor to generate a sales prospect recommendation by:
    uploading customer data including past purchasing data and demographic data for a plurality of customers, wherein the past purchasing data comprises a difference between a lead date and an order date for past transactions;
    requesting a sales prospect recommendation;
    receiving at least one sales prospect recommendation from a predictive model trained by the past purchasing data and the demographic data, wherein the at least one sales prospect recommendation comprises a prospective customer and product, and a probability that the prospective customer will purchase the product; and
    displaying the sales prospect recommendation on a user interface wherein each prospective customer is represented by a bubble;
    wherein the sales prospect recommendation further comprises an estimate of a time to close a sale of the product to the prospective customer, and an expected revenue from the sale;
    wherein the estimate of the time to close the sale of the product to the prospective customer is based at least on differences between the lead dates and the order dates for past transactions for customers that are similar to the prospective customer;
    wherein the user interface comprises a first axis of the probability that the prospective customer will purchase the product and a second axis of the estimate of the time to close the sale of the product to the prospective customer;
    wherein the bubble is positioned on the first axis and the second axis, and a size of the bubble represents the estimated revenue from the sale.

2. The computer-readable medium of claim 1, wherein demographic data comprises at least one of: a customer location, industry, headquarter country, public corporation status, importer status, exporter status, number of locations, number of employees, or annual revenue.

3. The computer-readable medium of claim 1, wherein the predictive model comprises an association rule model, a first cluster model, and a second cluster model.

4. The computer-readable medium of claim 3, wherein the first cluster model is built on the demographic data.

5. The computer-readable medium of claim 3, wherein the second cluster model is built on the past purchasing data.

6. The computer-readable medium of claim 3, wherein the association rule model is used to predict a product/customer pair and a probability that the sale will occur.

7. A computer-implemented method for generating a sales prospect recommendation, comprising:
    receiving by a processor customer data including past purchasing data and demographic data for a plurality of customers, wherein the past purchasing data comprises a difference between a lead date and an order date for past transactions;
    generating by the processor a predictive model trained by the past purchasing data and the demographic data;
    receiving a query for a sales prospect recommendation;
    responding to the query with at least one sales prospect recommendation based on the predictive model; and
    causing the displaying of the sales prospect recommendation on a user interface;
    wherein the at least one sales prospect recommendation comprises a prospective customer and product, and a probability that the prospective customer will purchase the product;
    wherein the sales prospect recommendation further comprises an estimate of a time to close a sale of the product to the prospective customer, and an expected revenue from the sale;
    wherein the estimate of the time to close the sale of the product to the prospective customer is based at least on differences between the lead dates and the order dates for past transactions for customers that are similar to the prospective customer;
    wherein the user interface comprises a first axis of the probability that the prospective customer will purchase the product and a second axis of the estimate of the time to close the sale of the product to the prospective customer, and each prospective customer is represented by a bubble;

wherein the bubble is positioned on the first axis and the second axis, and a size of the bubble represents the estimated revenue from the sale.

8. The method of claim 7, wherein the predictive model includes an association rule model, a first cluster model, or a second cluster model.

9. The method of claim 8, wherein the first cluster model is built on the demographic data.

10. The method of claim 8, wherein the second cluster model is built on the past purchasing data.

11. The method of claim 8, wherein the association rule model comprises an Apriori algorithm.

12. A system for generating a sales prospect recommendation, comprising:

a processor;

computer readable media coupled to the processor storing instructions that implement a sales modeler when executed by the processor, and storing a customer data file;

the customer data file including demographic data and past purchasing data for a plurality of customers, wherein the past purchasing data comprises a difference between a lead date and an order date for past transactions;

the sales modeler trained using the customer data file that receives a prospective customer name as an input and outputs a product name and a probability that a prospective customer corresponding to the customer name will purchase a product corresponding to the product name; and a user interface generated at least in part by the processor for querying the sales modeler;

wherein the sales modeler further outputs an estimate of a time to close a sale of the product to the prospective customer, and an expected revenue from the sale;

wherein the estimate of the time to close the sale of the product to the prospective customer is based at least on differences between the lead dates and the order dates for past transactions for customers that are similar to the prospective customer;

the user interface comprising a first axis of the probability that the prospective customer will purchase the product and a second axis of the estimate of the time to close the sale of the product to the prospective customer;

wherein at least one bubble for each prospective customer is positioned on the first axis and the second axis, and a size of the bubble represents the estimated revenue from the sale.

13. The system of claim 12, wherein the sales modeler includes an association rule model, a first cluster model, and a second cluster model.

14. The system of claim 13, wherein the first cluster model is built on the demographic data.

15. The system of claim 13, wherein the second cluster model is built on the past purchasing data.

16. The system of claim 13, wherein the association rule model comprises an Apriori algorithm.

17. A non-transitory computer-readable medium having instructions stored thereon that, when executed by a processor, cause the processor to generate a sales prospect recommendation by:

uploading customer data including past purchasing data and demographic data for a plurality of customers, wherein the past purchasing data comprises a difference between a lead date and an order date for past transactions;

requesting a sales prospect recommendation; and receiving at least one sales prospect from a predictive model trained by the past purchasing data and the demographic data, wherein the at least one sales prospect comprises a prospective customer and product, wherein the predictive model includes an association rule model, a first cluster model built on the demographic data, and a second cluster model built on the past purchasing data, and wherein the first and second cluster models are used to predict a probability that the prospective customer will purchase the product, an estimated time to close the sale and an estimated revenue from the sale;

displaying the sales prospect recommendation on a user interface wherein each prospective customer is represented by a bubble;

wherein the estimate of the time to close the sale of the product to the prospective customer is based at least on differences between the lead dates and the order dates for past transactions for customers that are similar to the prospective customer;

wherein the user interface comprises a first axis of the probability that the prospective customer will purchase the product and a second axis of the estimate of the time to close the sale of the product to the prospective customer;

wherein the bubble is positioned on the first axis and the second axis, and a size of the bubble represents the estimated revenue from the sale.

* * * * *